United States Patent [19]

Knowlton

[11] 4,038,590

[45] July 26, 1977

[54] PULSE CODE MODULATION RADIO CONTROL SYSTEM

[76] Inventor: Dennis J. Knowlton, 1915 Park, Laramie, Wyo. 82070

[21] Appl. No.: 538,338

[22] Filed: Jan. 3, 1975

[51] Int. Cl.² .............................................. G05B 11/32

[52] U.S. Cl. ...................................... 318/562; 318/16; 343/225

[58] Field of Search ........................ 318/562, 16, 696; 179/15 AP; 343/225

[56] References Cited

U.S. PATENT DOCUMENTS

| | | | |
|---|---|---|---|
| 3,110,850 | 11/1963 | Young | 318/562 |
| 3,426,153 | 2/1969 | Kitsopoulos | 179/15 AP |
| 3,587,100 | 6/1971 | Doremus | 318/16 |
| 3,619,510 | 11/1971 | Zegers | 179/15 AP |
| 3,660,606 | 5/1972 | DeWitt | 179/15 AP |
| 3,742,145 | 6/1973 | Clark et al. | 179/15 AP |
| 3,793,636 | 2/1974 | Clark et al. | 343/225 |
| 3,806,939 | 4/1974 | Palmiere | 343/225 |

*Primary Examiner*—Robert K. Schaefer
*Assistant Examiner*—John J. Feldhaus
*Attorney, Agent, or Firm*—Pollock, Vande Sande & Priddy

[57] ABSTRACT

A pulse code modulation communication system adapted in a preferred embodiment to the remote control of a flying model aircraft. The positions of the various control sticks are represented by a digital code which is multiplexed and then transmitted via pulse code modulation of a unique subcarrier signal. The unique subcarrier signal is locked onto by the receiver which, through correlation detection, detects and demultiplexes the digital code for use by the servo motors to position the flight control surfaces of the aircraft.

7 Claims, 7 Drawing Figures

PULSE CODE MODULATION RADIO CONTROL SYSTEM

BACKGROUND OF THE INVENTION

1. Field of the Invention

The present invention is related to a communication system and, more particularly, to a pulse code modulation communication system utilized for the remote control of flying model aircraft.

2. Description of the Prior Art

In remote control radio systems utilized for flying a model aircraft it is necessary to position the flight control surfaces of the aircraft in response to commands from the ground. Further, it is necessary to position such control surfaces in a manner directly related to the movement of a control stick, or a plurality of such control sticks, operated by the ground-based pilot. The mechanism utilized to position the flight control surfaces in the aircraft is commonly referred to as a servo which generally comprises an electromechanical unit including a motor whose output is controlled by command voltage inputs.

Prior art remote control systems utilized for controlling the flight of model aircraft have generally been of an analog nature wherein a series of pulses, each corresponding to a different control command, are utilized to modulate an RF carrier wave operating at a particular frequency. In such a system, while the frame rate is fixed, the time interval between any two successive pulses within a frame may be varied. It is this variable width between individual pulses that is utilized to position the servo motors, one of each of the variable width segments being utilized to control each servo. A decoder in the receiver passes the first pulse to the first servo unit, the second pulse to the next servo unit, and so forth, such that each servo unit receives one pulse from each frame, the length of the pulse being determinative of the position of the corresponding servo.

While such analog systems have been generally acceptable, they suffer from certain inherent deficiencies such as a lack of linearity in the servo output and susceptibility to random noise. Further, each radio control system of this type must be constructed to operate at a different RF carrier frequency to avoid adjacent system interference.

OBJECTS AND SUMMARY OF THE INVENTION

It is accordingly a primary object of the present invention to provide a radio remote control system for flying model aircraft and the like which overcomes the foregoing disadvantages.

Another object of the present invention is to provide a digital code radio control system A further object of the present invention is to provide a radio control system for flying model aircraft and the like in which the control sticks' positions are represented by digital codes which are transmitted via pulse code modulation of a unique subcarrier signal.

A still further object of the present invention is to provide a radio control system for flying model aircraft and the like wherein a digital pulse code modulated subcarrier signal is locked onto by the receiver which utilizes correlation detection to detect the digital code.

An additional object of the present invention is to provide an all-digital radio control system for the remote control of flying aircraft and the like which features improved servo linearity, transmission noise immunity, and multiple use of a single RF carrier frequency.

The foregoing and other objects are attained in accordance with one aspect of the present invention through the provision of a pulse code modulation radio control system which comprises a plurality of shaft encoders which produce Gray code digital output signals indicative of the position of a plurality of control sticks. A multiplexer is utilized to successively interrogate each of the plurality of shaft encoders and provide serial digital output data which is then passed through a code converter for conversion from Gray to binary digital code. The binary coded output of the code converter is utilized to modulate the phase of a unique subcarrier signal which may comprise, for example, a triangular wave. The bi-phase modulated subcarrier is utilized in turn to modulate an RF carrier signal which is then transmitted.

In the receiver, the phase modulated subcarrier signal is detected and passed through two sections. The first section includes a phase locked loop whose output forms the basis for the receiver timing. The other section comprises a correlation detector which includes an integrator, a voltage comparator, and a digital multiplier, the latter circuit also receiving a phase timing signal from the output of the phase locked loop. The output of the correlation detector corresponds to the desired digital data which is then demultiplexed and sent to the proper servos.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF A PREFERRED EMBODIMENT

Figure 1A:
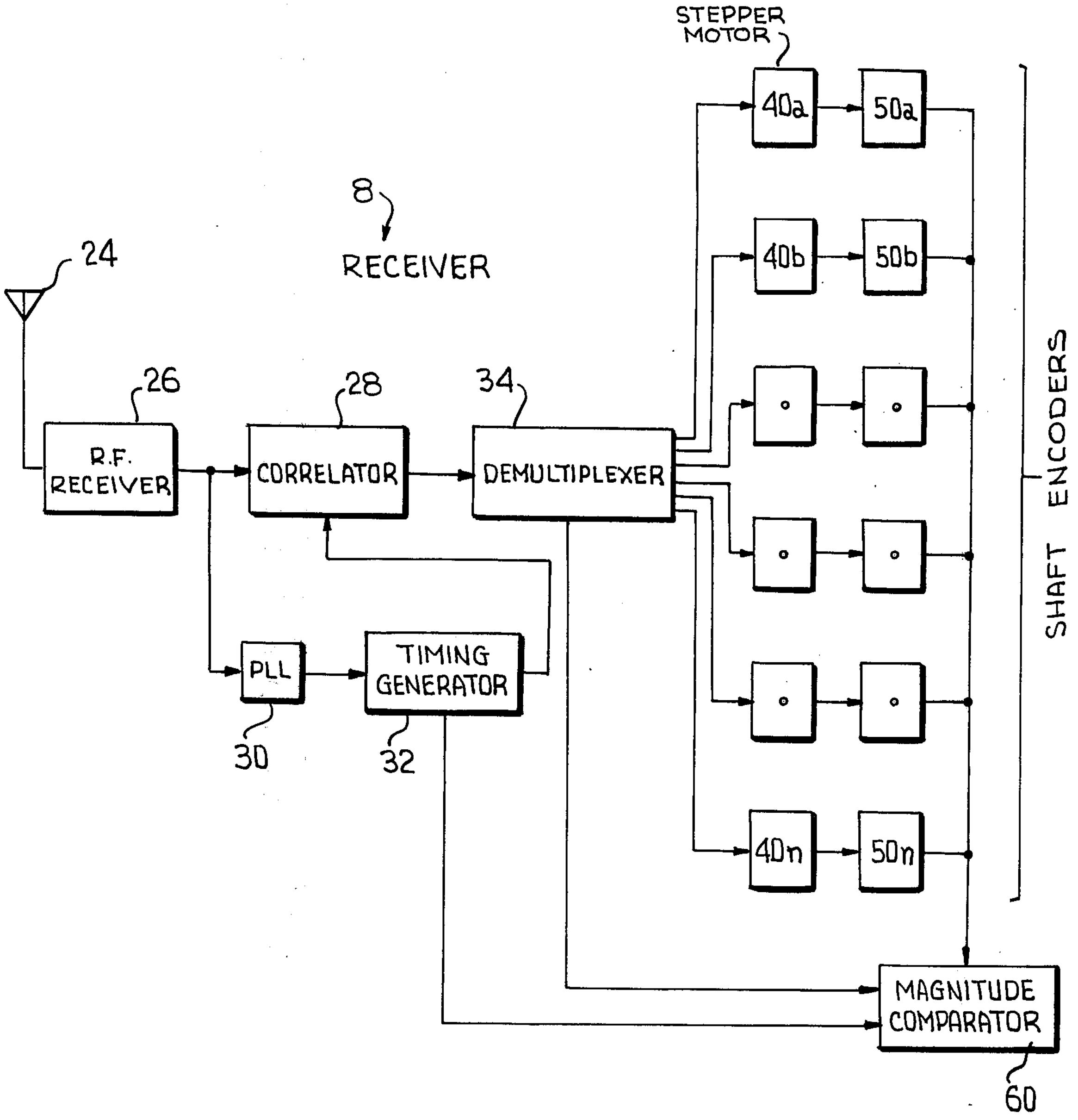
FIGS 1*a* and 1*b* comprises a block diagram illustrating the overall radio control system according to the present invention.
Figure 1B:
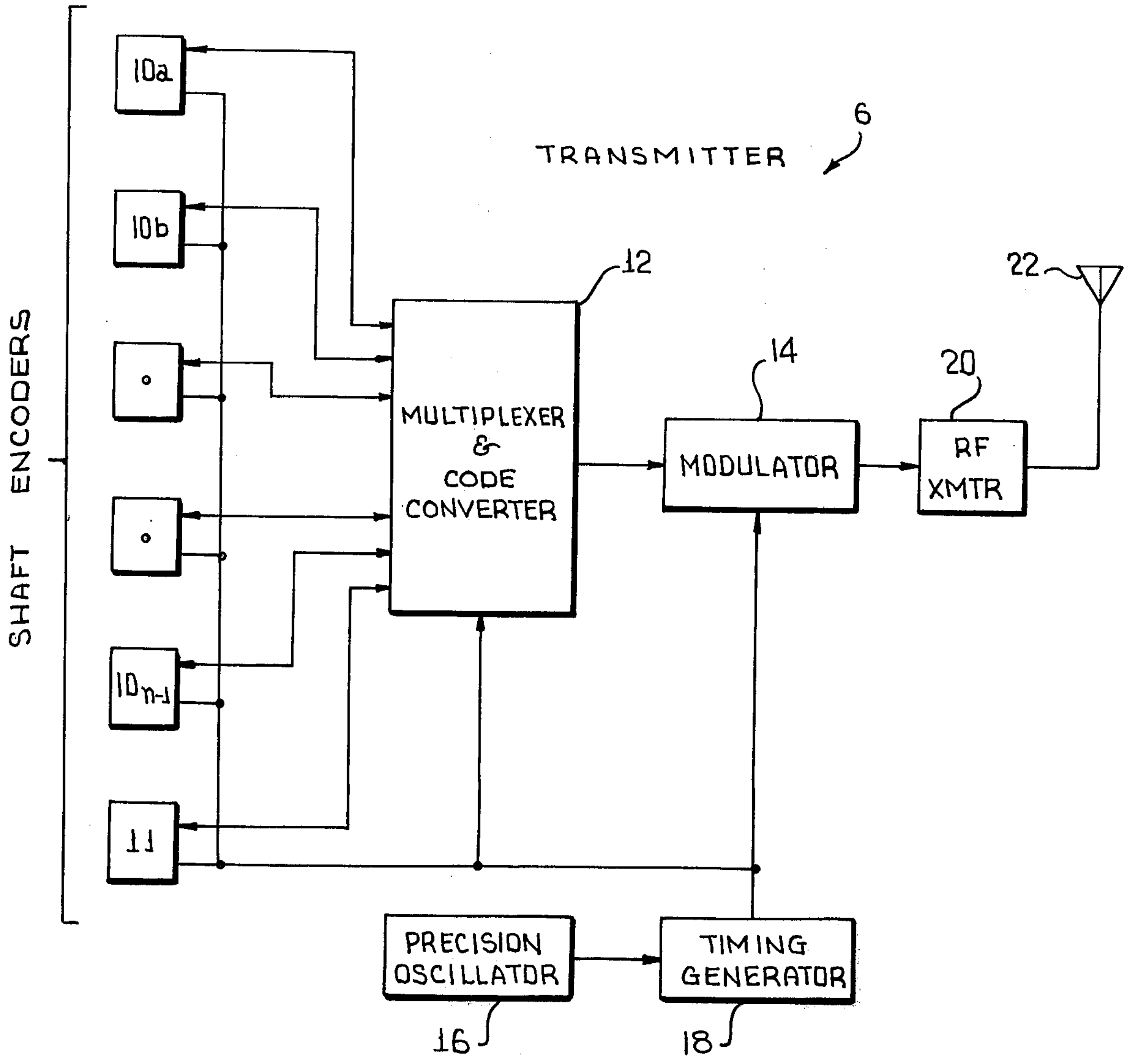

Referring first to FIG. 1*a* and 1*b,* there is illustrated a block diagram of the primary components associated with and comprising the transmitter 6 and receiver 8 of a preferred embodiment of the radio control system of the present invention. The transmitter 6, under the control of the ground-based pilot, includes a plurality of shaft encoders $\mathbf{10}_1$, $\mathbf{10}_b$, . . . , $\mathbf{10}_{n-1}$. The shaft encoders 10 measure the movement of associated control sticks (not shown) which are under the manual control of the operator/pilot. A typical manual control stick unit may comprise, for example, two axis gimbal mechanisms wherein each axis' movement is measured by a shaft encoder. For example, if shaft encoder $10_a$ is connected to the pitch axis gimbal, it will output a digital code which represents the absolute angular movement in the pitch axis. The digital code from shaft encoder $10_a$, along with the digital codes representing the movements in the other axes as detected by shaft encoders $10_b$ through $10_{n-1}$, along with the code supplied by retract switch 11, together comprise the control commands sent from the pilot to the aircraft. Retract switch 11 is utilized to control retractable landing gear on the aircraft.

The shaft encoders 10, along with retract switch 11, are serially interrogated by a multiplexer 12. The serial digital code forming the shaft encoder outputs is preferably a Gray code which, as is well known, is a unit-distance binary code containing $2_n$ code words in which the code word for the largest integer $(2^{n-1})$ is distance 1 from the code word for the least integer (0). As is known in the art, the attractive feature of the Gray code is the simplicity of the algorithm for translating from the binary code into the Gray code, and vice-versa. The use of Gray code is preferable when driving a shaft encoder at random to avoid crossover errors when making the transition from one bit to an adjacent one.

The serial digital Gray code output from the shaft encoders is converted by code converter 12 into binary code for transmission. The serialized digital binary data from the output of code converter 12 is fed to a modulator 14 which receives as its other input a subcarrier signal generated by a precision oscillator 16 and a timing generator 18. The serialized digital binary data is utilized to modulate the subcarrier, the resultant waveform being in turn utilized to modulate an RF carrier signal in RF transmitter 20 for transmission via antenna 22.

Referring now to the receiver unit 8, the signal is received via antenna 24 by an RF receiver 26 which may be of standard design having automatic gain control and linear detection. The detected signal from RF receiver 26 is fed to a correlator 28 and to a phase locked loop 30. The phase locked loop 30 controls the bandwidth and determines the center frequency for the particular receiver's subcarrier. A timing generator 32 receives the output from the phase locked loop 30 for deriving timing signals for demultiplexing and correlation. A phase timing signal timing generator 32 and the detected output signal from RF receiver 26 are digitally multiplied in correlator 28. The output from correlator 28 is then demultiplexed by demultiplexer 34 and then fed to the proper servo, such as servo $40_a$, to be compared with its shaft position code which is output by its corresponding shaft encoder $50_a$. The comparison, which may be made by a magnitude comparator 60, may comprise a simple arithmetic binary addition, the result of which is utilized to drive the corresponding servo the proper amount in the proper direction.

Figure 2:
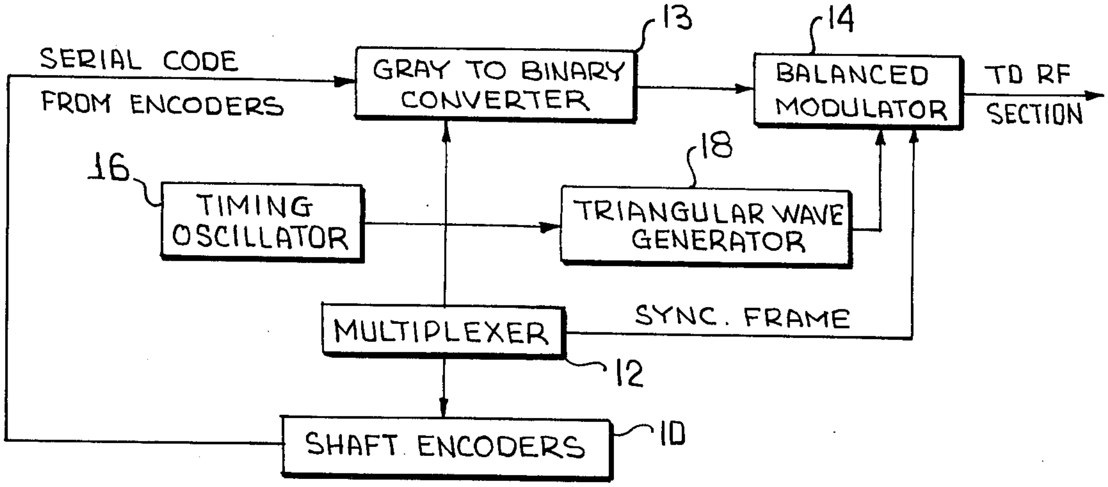
FIG. 2 is a block diagram illustrating in somewhat more detail the transmitter of the system shown in FIG. 1*b;*
Figure 4:
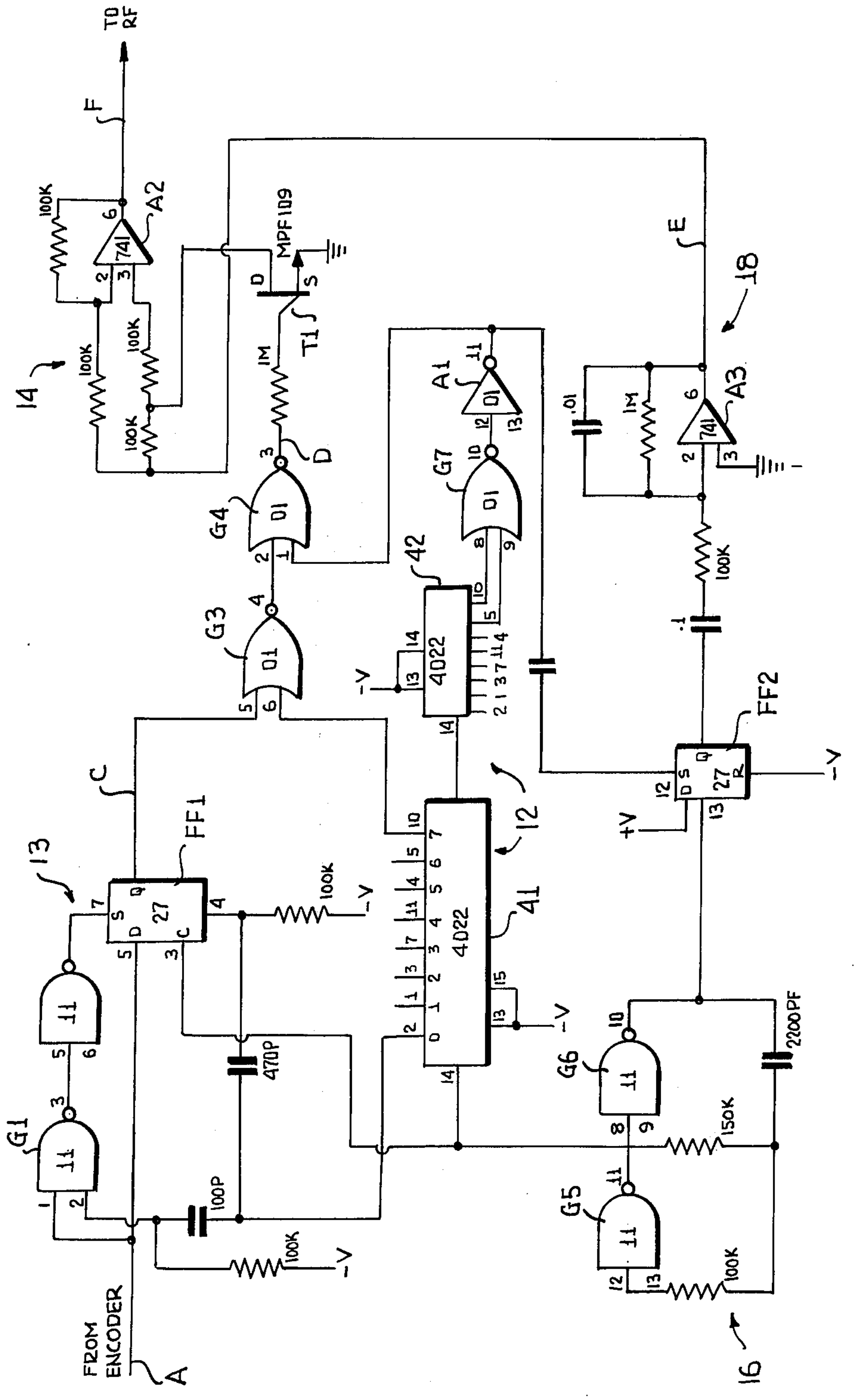
FIG. 4 is a schematic circuit diagram illustrating a preferred embodiment of the transmitter according to the present invention.
Figure 6:
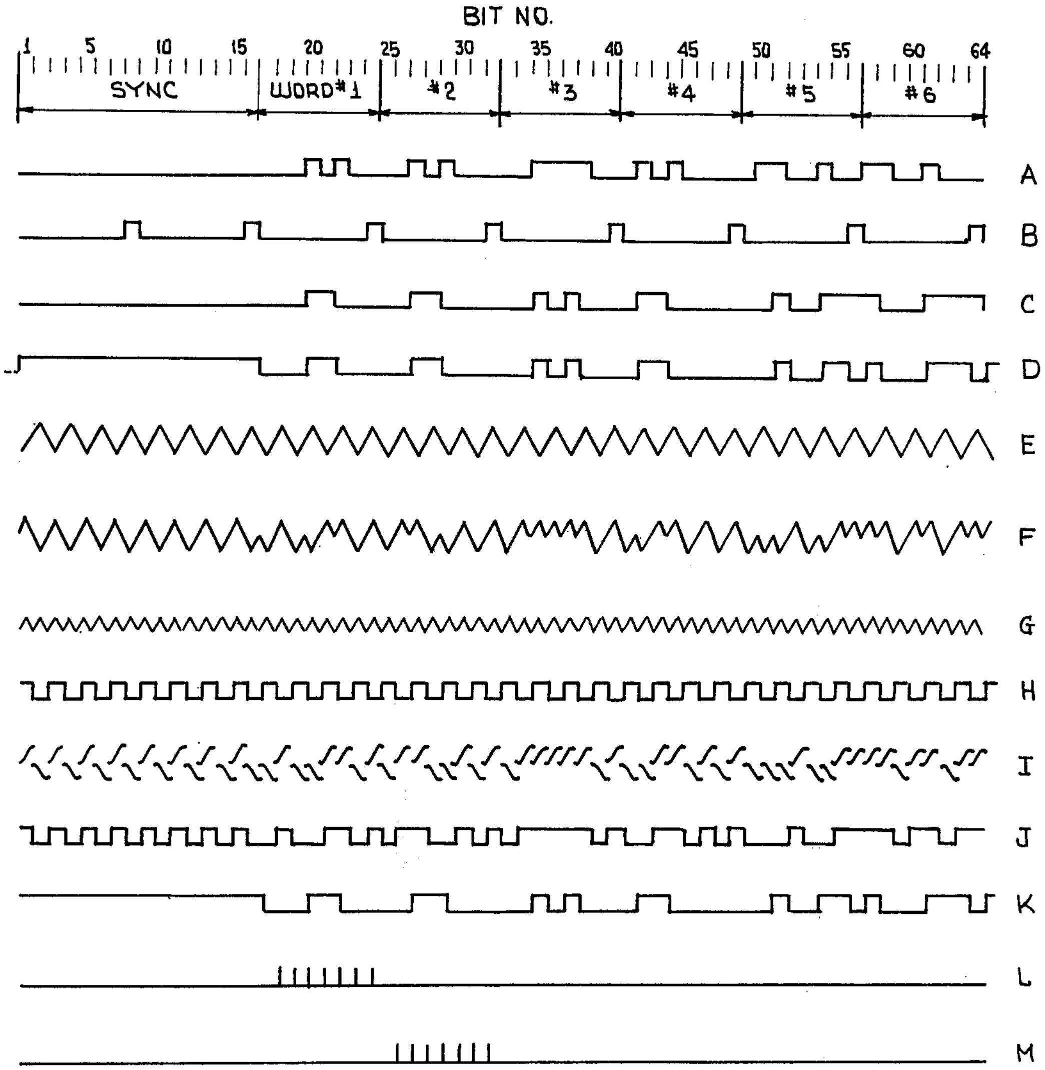
FIG. 6 is a timing diagram illustrative of various waveforms generated by the circuitry of FIGS. 4 and 5.

Referring now to FIGS. 2 and 4, there is illustrated a preferred embodiment of the transmitter of the system of the present invention in block and corresponding schematic diagrams, respectively. Reference letter A through F denoted in FIG. 4 indicate the point of occurrence of the correspondingly lettered waveforms illustrated in the timing diagram of FIG. 6. Indicated at the top of FIG. 6 is the bit timing for one frame which consists of eight channels of information. The first two channels, which comprise 16 bits, are the frame synchronization channels, whereas the next six channels, comprising eight bits each, consist of the six channels of information generated by the five shaft encoders and the retract switch illustrated in FIG. 1, a typical output from the shaft encoders being represented by waveform A.

The subcarrier waveform utilized in this preferred embodiment comprises a triangular waveform as illustrated in FIG. 6 by waveform E. Triangular waveform E is generated by triangular wave generator 18 which comprises, as seen in FIG. 4, an operational amplifier A3 connected as an integrator for integrating the square wave output of the timing oscillator 16. Timing oscillator 16 comprises NAND gates G5 and G6 connected as an astable multivibrator using CMOS logic. Timing oscillator 16 generates the basic timing pulses for the entire data link at a frequency of approximately 1,400 Hz. The square wave output from oscillator 16 is fed through flip- flop FF2 which is connected in a divided-by-two configuration and is synchronized by a main sync pulse delivered from amplifier A1. The divide-by-two circuit FF2 is utilized since the triangular waveform E is seen to be half the frequency of the data rate (as represented by waveform G of FIG. 6).

The multiplexer 12 comprises two divide-by-eight counters 41 and 42 with decoded outputs. Counter 42 generates the frame sync via output bits 6 and 7. When either bit 6 or 7 is high, an NOR gate G7 generates a pulse which is fed through amplifier A1 and an NOR gate G4 to hold the input to the modulator (waveform D) in one position such that modulator 14 will generate a symmetrical waveform (waveform F) for the sync frame as illustrated in FIG. 6.

Counter 41 of multiplexer 12 generates the word sync from bit 7 of its output (waveform B), the last bit always being zero. Counter 42 also selects the particular shaft encoder to be interrogated, while counter 41 interrogates successive bits of that encoder, starting with the most significant. For example, shaft encoder **10*a* is selected by the output of pin 2 of counter 42, whereafter counter 41 selects the first bit of shaft encoder 10*a* by means of its pin 2** output.

The bit-selecting output from counter 41 is fed to one input of a NAND gate G1 which recives as its other input the serial data, in a gray code, from the selected shaft encoder, as represented by word No. 1 of waveform A of FIG. 6. The process of successive encoder and bit interrogation by counters 41 and 42 is repeated until the entire frame of information represented by waveform A has been fed into code converter 13.

The Gray-to-binary converter 13 consists essentially of NAND gates G1 and G2, and a JK flip-flop FF1 which receives clock pulses from timing oscillator 16. Converter 13 utilizes serial conversion to change the Gray code input to a binary code output. In the conversion, the most significant bit is copied exactly by gates G1 and G2. Successive bits are clocked in by the D input of flip-flop FF1. IN operation. each successive bit in the Gray code is reversed if the immediately preceding bit is a "1"; if the preceding bit is a "0", the binary output will be the same. Since the JK flip-flop FF1 has the property that if the input is high, the output is reversed, and if the input is low; the output is the same, the desired code conversion will be achieved. The resistor and capacitors shown associated with code converter 13 are selected such that flip-flop FF1 will be in the proper state to receive the first bit of information.

The output of code converter 13 (waveform C of FIG. 6) is fed to one input of an NOR gate G3. The other input to gate G3 is the word sync output (waveform B) from pin 10 of counter 41 which generates a pulse at the end of each data word. NOR gate G3 allows waveform C to pass until it receives a sync bit from pin 10 of counter 41.

The output from gate G3 is fed to an NOR gate G4 which passes that signal through to field effect transistor T1 of modulator 14 until the frame sync pulse is generated by counter 42.

The output of gate G4 comprises the serial binary coded data including all the syncs and word codes, as represented by waveform D of FIG. 6, and is fed as one input to the balanced modulator 14. Modulator 14 includes an operational amplifier A2 which accepts as its other input the triangular wave E generated by triangular wave generator 18. Balanced modulator 14 has the property of modulating the phase of the subcarrier triangular waveform to two discrete values 0° and 180° depending on the polarity of the pulse received at its modulating signal input. When the modulating signal input is a zero, the phase is 0° and when the modulating signal input is a one the phase is 180°.Thus, if the input is a one, the triangular wave is inverted at the crossover point corresponding to a 180° phase shift. The output of modulator 14 is illustrated as waveform F of FIG. 6 which is fed to a linear RF carrier modulator for transmission.

Figure 3:
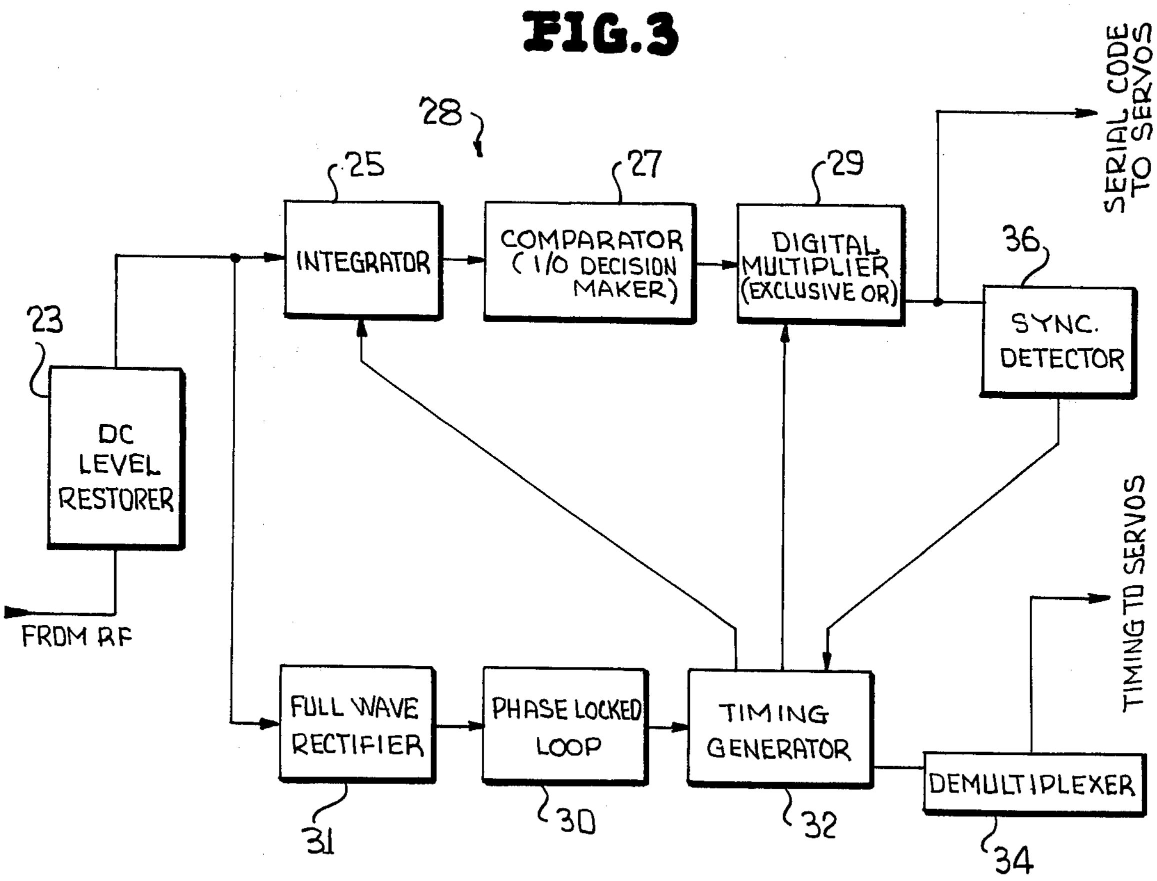
FIG. 3 is a block diagram illustrating in somewhat more detail the receiver of the system shown in FIG. 1*a;*
Figure 5:
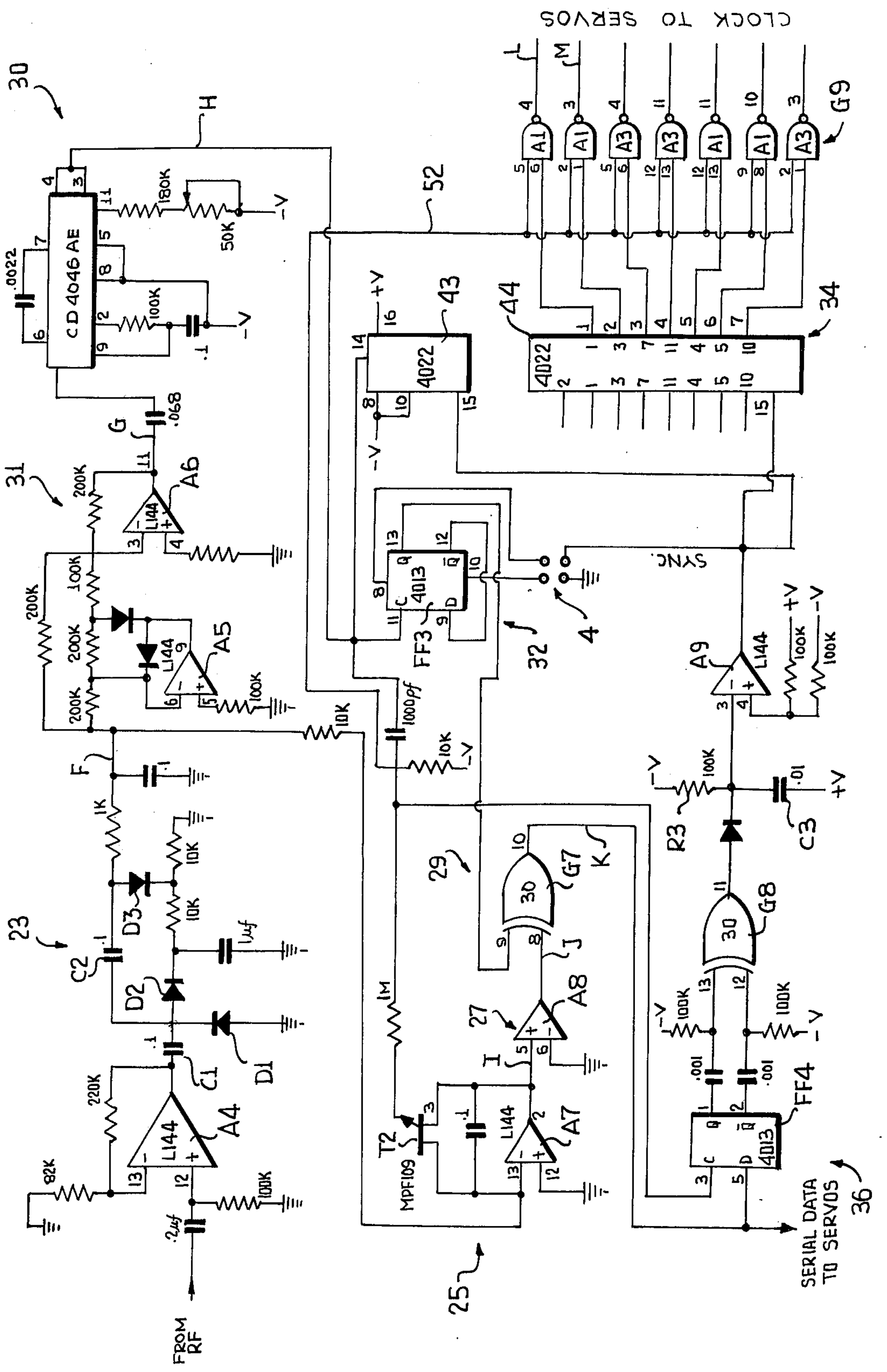
FIG. 5 is a schematic circuit diagram illustrating a prefered embodiment of the receiver according to the present invention.

Referring now to FIGS. 3 and 5, there is illustrated in block and schematic form, respectively, a preferred embodiment of the receiver according to the present invention. The received signal is first fed through an RF-IF section (not shown) which may be of conventional design having automatic gain control and linear detection. The detected signal is first fed through a DC level restorer 23 which comprises a peak detector and includes a small gain buffer amplifier A4 and associated clamping circuitry. The output from amplifier A4 is fed through a capacitor C1 and is clamped to ground by a diode D1. Diode D2 comprises a peak detector whose output is half the value of the input at the midpoint of the two 10K resistors. The signal is again clamped to that half value by means of diode D3 such that the output signal (waveform F of FIG. 6) will be clamped at half the peak value of the input signal to restore the DC level thereto.

To reconstruct the digital information, the DC level-restored detected signal is fed through two sections of the receiver. The first section includes a full wave rectifier 31 consisting essentially of amplifiers A5 and A6. Amplifier A5 determines whether the input signal is positive or negative and will feed to amplifier A6 a voltage two times the input value in either a positive or negative direction depending on the input, the outyut of amplifier A6 being a triangular wave at twice the fundamental frequency (i.e., second harmonic to the subcarrier) and essentially independent of the data input.

The output from full wave rectifier 31 is fed to a phase locked loop 30 which may comprise a conventional integrated circuit ICl configured as shown. Phase locked loop 30 produces a square wave output signal (waveform H of FIG. 6) at exactly the frequency of the second harmonic of the signal input. Accordingly, the output of phase locked loop 30 is locked to the transmitter oscillator at exactly the data bit rate. This signal (waveform H) forms the basis for all of the receiver's timing.

The other section through which the DC level restored detected signal (waveform F) is fed consists of correlator 28 which comprises an integrator 25, a comparator 27, and a digital multiplier 29. Integrator 25 includes amplifier A7 and FET transistor T2. Integrator 25 integrates each bit or half cycle of its input and is reset by a signal from the timing generator 32 via transistor T2. The process is then repeated and is a means for removing the random noise in the signal. The output of the integrator 25 is illustrated by waveform I of FIG. 6.

The output of integrator 25 is fed to a phase comparator 27 which consists of amplifier A8. Comparator 27 determines if the output from integrator 25 is a one or a zero at the end of each bit and produces an output waveform (waveform J of FIG. 6) in accordance therewith.

The final component of correlator 28 is a digital multiplier 29 which consists of an EXCLUSIVE-OR gate G7. Gate G7 receives at one input thereto the output from comparator 27, and at the other input thereto a receiver reference input from timing generator 32. The EXCLUSIVE-OR gate G7 digitally multiplies the output of comparator 27 with the receiver reference input. The output of multiplier 29 (waveform K of FIG. 6) is a serial data string identical to the input to the balanced modulator 14 (waveform D) in the transmitter. This code is output to the servo, along with timing pulses used to demultiplex the frame code.

The timing generator 32 comprises a series of circuits including a flip-flop FF3 and a divider 43 utilized for generating the integrator reset pluse (pin 14 of divider 43), the data shift pulse (pin 15 of divider 43), and the receiver reference input (pin 13 of flip-flop FF3) to the digital multiplier 29. Flip-flop FF3 comprises a simple divided-by-two circuit which has as its clock input the output from phase locked loop 30. The output of flip-flop FF3 will accordingly be at the same base frequency as generated by the triangular wave generator in the transmitter. Since the entire system must be synchronized at some point in time, the four terminals 4 are provided and may be connected as desired to achieve the proper phase for timing and synchronization. The connections between the terminals 4 depends on whether it is desired to set or reset flip-flop FF3 at the leading edge of the sync pulse from divider 43. The desired end result is that flip-flop FF3 be in exactly the same state in any point in time as flip-flop FF2 in the transmitter circuitry.

Demultiplexer 34 may be identical to the transmitter multiplexer and consists of two divide-by-eight counters 43 and 44 and associated octal decoders G9. Divider 43 selects the servo to which the signal is to be sent, while divider 44 puts the serial data back into parallel form. The output of multiplexer 34 is clocked via line 52 through gates G9 to the servos. Output waveforms L and M of FIG. 6 correspond to the clocked outputs from the first two gates of G9 and are fed to the first two servos for decoding words No. 1 and No. 2.

A sync detector circuit 36 is also provided which includes a flip-flop FF4, an EXCLUSIVE-OR gate G8, and an amplifier A9. Flip-flop FF4 of sync detector 36 receives as one input the output from digital multiplier 29 which comprises the serial data train also fed to the servos. The other input to flip-flop FF4 is the output from the phase locked loop 30 which is a square wave at exactly the data bit rate. If, for example, the data input to flip-flop FF4 is all "1"s, the output state thereof will not change. At the end of the receipt of a sync pulse, the output of flip- flop FF4 will change state, either from a 1 to a 0, or from a 0 to a 1. This will yield a positive pulse from one of the two parallel outputs which will pulse the EXCLUSIVE-OR gate G8. The output from gate G8 is fed through a comparator circuit consisting essentially of amplifier A9 for level conversion. If the output pulse is high enough, capacitor C3 will charge to deliver a sync pulse. By selecting the time constant provided by resistor R3 and capacitor C3, a certain minimum time interval must pass before another pulse is received to set the sync. In other words, the sync pulse will pass only if it arrives at regular intervals.

It is seen by virtue of the foregoing that I have provided an all-digital radio control system for remote control of flying aircraft and the like. Since the positional information of the control sticks is in the form of a digital code, servo linearity will be absolute. Further, due to the tight equivalent bandwidth afforded by correlation detection of a bi-phase modulated subcarrier, random noise may be easily attenuated. Additionally, due to the tight equivalent bandwidth, more than one subcarrier may be used simultaneously on the same RF carrier. Each receiver will be locked on to its own subcarrier frequency by virtue of its phase locked loop, and will consequently ignore the signals of other systems' subcarrier as random noise.

Obviously, numerous modifications and variations of the present invention are possible in light of the above teachings. A person of ordinary skill in the art will be able, based on the above principles, to design many circuits of the type illustrated in FIGS. 4 and 5 for achieving the present invention. For example, while the type of subcarrier modulation has been selected for illustration as triangular wave modulation, it is known that a Gaussian waveform is theoretically the most noise-immune. However, I have found that the triangular wave is both easier to generate and less sensitive to data link phase shifting. The digital codes may, of course, be handled either serially or in parallel, depending on various design considerations such as cost, power consumption, chip count, data format for code redundancy, ease of syncing, subharmonic content, and the like. It is therefore to be understood that within the scope of the appended claims the invention may be practiced otherwise than as specifically described herein.

What is claimed is:

1. A pulse code modulation radio control system particularly suited for the remote control of model aircraft which comprises:

shaft encoder means for producing digital output signals indicative of the position of a plurality of control members;

means responsive to said digital output signal for modulating the phase of a subcarrier signal to shift the phase of said subcarrier signal in response to digital signals of one type by 180°;

means for transmitting an r-f carrier signal modulated by said phase-modulated subcarrier signal;

receiver means for detecting said phase-modulated subcarrier signal from said r-f carrier signal;

a phase-locked loop circuit connected to receive the output from said receiver means; and correlation detection means for receiving the output from said receiver means and the output from said phase-locked loop circuit and for producing an output digital pulse train corresponding to said digital output signals.

2. The system as set forth in claim 1, wherein said correlation detection means comprises:

an integrator circuit connected to receive the output from said receiver means;

comparator means connected to receive the output from said integrator circuit for producing a digital output signal according to the magnitude of the output from said integrator; and a digital multiplier circuit for multiplying said digital output signal from said comparator means with another digital signal produced in response to the output from said phase-locked loop circuit.

3. The system as set forth in claim 2, wherein said digital output signals produced by said shaft encoder means are in a Gray code, and further comprising means for converting said Gray code digital output signals into binary code digital signals which are fed to the input of said phase modulating means.

4. The system as set forth in claim 3, further comprising multiplexer means connected to said shaft encoder means for successively interrogating each of the plurality of shaft encoders which comprise said shaft encoder means and for serializing the digital output data therefrom.

5. The system as set forth in claim 4, further comprising a plurality of servo motors corresponding to said plurality of shaft encoders, and means for demultiplexing said output digital pulse train from said correlation detection means whereby the digital data produced by a particular shaft encoder is directed to its corresponding servo motor.

6. The system as set forth in claim 5, further comprising a triangular waveform generator whose output comprises said subcarrier signal in which said triangular waveform generator is connected to said means for modulating.

7. The system as set forth in claim 6, wherein said phase modulating means comprises a balanced modulator connected to the output from said converting means, the output of said balanced modulator comprising a triangular wave having 180° phase shifts at each bit transistion of said binary code digital signals.

* * * * *